United States Patent
Chen

(10) Patent No.: US 6,298,775 B1
(45) Date of Patent: Oct. 9, 2001

(54) PAN WITH A FOLDABLE HANDLE

(76) Inventor: Ching-Fu Chen, No. 2, Dong Ning Rd., Tainan (TW)

( * ) Notice: Subject to any disclaimer, the term of this patent is extended or adjusted under 35 U.S.C. 154(b) by 0 days.

(21) Appl. No.: 09/826,919

(22) Filed: Apr. 6, 2001

(51) Int. Cl.[7] ............. A47J 27/00; A47J 37/00; A47J 45/06; A47J 45/07; A47J 45/10
(52) U.S. Cl. ............... 99/422; 99/340; 99/403; 99/449; 16/111.1; 16/422; 16/425
(58) Field of Search .............. 99/337, 338, 340, 99/403, 410, 422–425, 449, 646 R; 16/110.1, 111.1, 422, 425, 434, 444, DIG. 41; 126/390.1, 373.1, 369; 220/316, 735, 752, 755, 759, 912; 294/30, 57, 58, 19.1, 25, 1.1; D7/357, 361, 395

(56) References Cited

U.S. PATENT DOCUMENTS

| | | | |
|---|---|---|---|
| 4,014,129 | * | 3/1977 | Capra ................... 99/422 X |
| 4,171,144 | * | 10/1979 | Rodriguez ............... 294/30 |
| 4,574,777 | * | 3/1986 | Bohl et al. ............. 99/425 X |
| 4,653,468 | * | 3/1987 | Lemme et al. .......... 126/373 |
| 4,711,366 | * | 12/1987 | Chen ..................... 99/337 |
| 4,822,087 | * | 4/1989 | DeCarlo .................. 294/58 |
| 4,926,521 | * | 5/1990 | Gagnepain ............ 16/430 X |
| 5,125,130 | * | 6/1992 | Stanish ..................... 16/430 |
| 5,313,735 | * | 5/1994 | Latouche ............. 99/449 X |
| 5,365,832 | * | 11/1994 | Gaydoul .................. 99/422 |
| 5,373,608 | * | 12/1994 | Welch ................. 99/403 X |
| 5,673,458 | * | 10/1997 | Roult ...................... 16/425 |
| 5,715,570 | * | 2/1998 | Hyun ..................... 16/110.1 |

* cited by examiner

*Primary Examiner*—Timothy F. Simone
(74) *Attorney, Agent, or Firm*—Rosenberg, Klein & Lee

(57) ABSTRACT

A pan with a foldable handle comprises a holder at one side having a pair of lugs extending upwards from respective ends. One of the lugs has a hole connected to an end of a slot. The slot has a width slightly smaller than the inner diameter of the hole of the lug. The handle has a pair of elastic rods at front end extending outwardly. The end of each elastic rod is bent outward to form an angled end to be inserted into a corresponding hole of the lug. One angled end inserted into the slot of the hole of the lug is formed in a flat shape so that it may stay in the slot. The thickness of the angled end is smaller than the width of the slot and the width of the angled end is smaller than the inner diameter of the hole, so that it may spin back and forth in the hole for folding the handle, and when the angled end is inserted into the slot, the handle is fixed at position.

2 Claims, 4 Drawing Sheets

PAN WITH A FOLDABLE HANDLE

FIELD OF THE INVENTION

This invention relates to a pan with a foldable handle, and more particularly to a pan that is easy to handle and operate.

BACKGROUND OF THE INVENTION

There are so many pans in the market with carious design for different functions. A fried pan has a shallow body with a long handle secured at one side thereof for a cooker to handle. Some cookers like to hold the pan and shake it up and down while cooking. Some plates or pans also have the handle design to hold easily. A conventional handle extending outwardly is secured by fasteners to one side of the pan and, however, the handle sticks outward requires much space to store.

In view of this, the inventor has invented a pan, which has a foldable handle that takes less space to store.

SUMMARY OF THE INVENTION

It is the primary object of the present invention to provide a pan with a foldable handle, which has a foldable handle for easy to store.

It is another object of the present invention to provide a pan with a foldable handle, which is easy to operate.

It is another object of the present invention to provide a pan with a foldable handle, which is replaceable if the handle is broken.

DETAILED DESCRIPTION OF THE PREFERRED EMBODIMENTS

Figure 1:
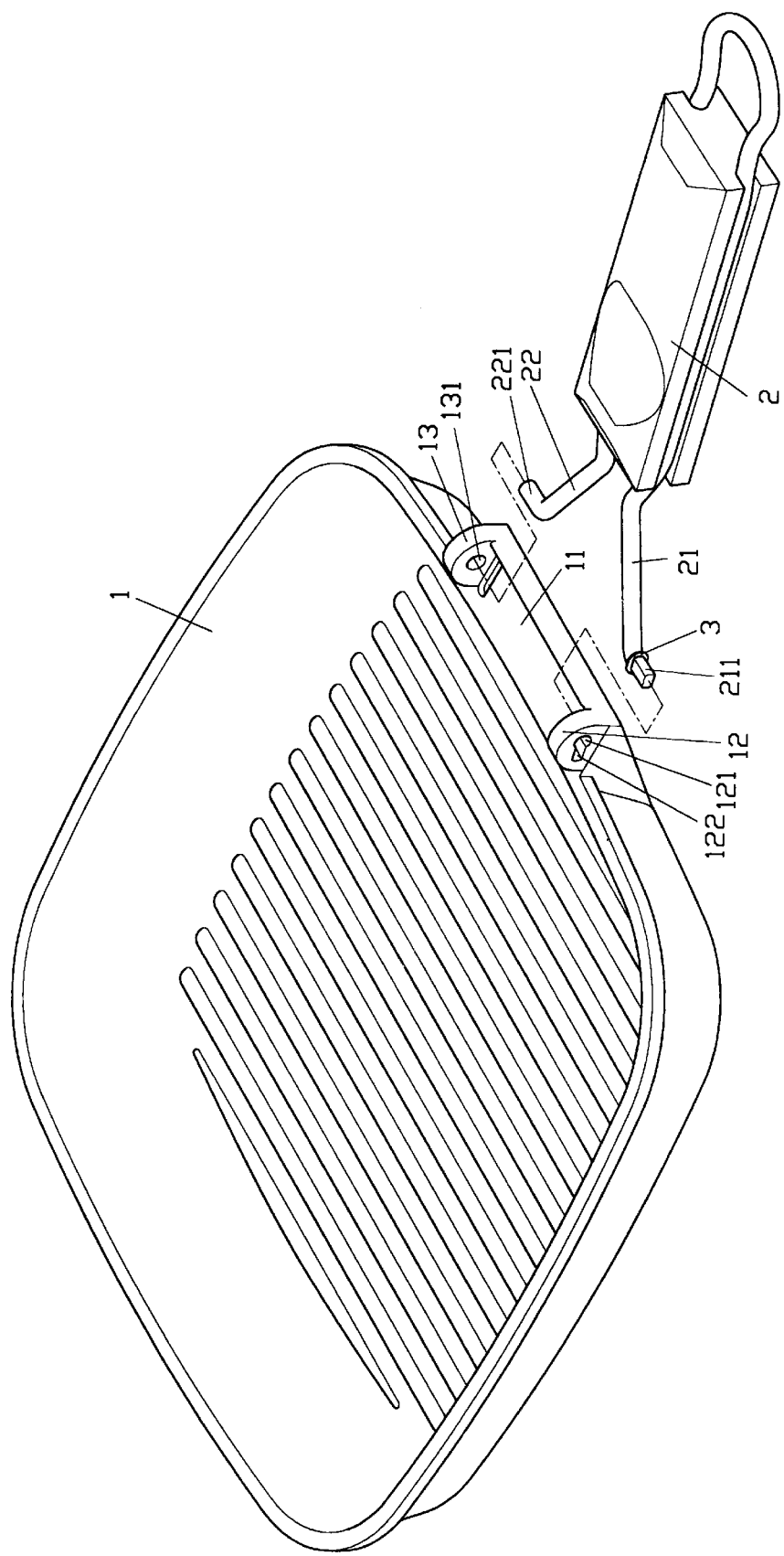
FIG. 1 is an exploded view of the present invention.

Reference is now made to FIG. 1 of the present invention, which comprises a pan 1 and a handle 2.

The pan 1 has a holder 11 at one side formed by a pair of lugs 12 and 13. Each of the lugs 12 and 13 has a hole 121 and 131 at center portion thereof. The hole 121 of the lug 12 is connected to an end of a slot 122 which has a smaller diameter than that of the hole 121.

The handle 2 has a pair of elastic rods 21 and 22 with a pair of angled ends 211 and 221 on each rod 21 and 22, respectively. The angled end 211 is in a flat shape. The thickness of the angled end 211 is smaller than the width of the slot 122 and the width of the angled end 211 is smaller than the inner diameter of the hole 121. A washer 3 is secured at one end of the angled end 211.

Figure 2:
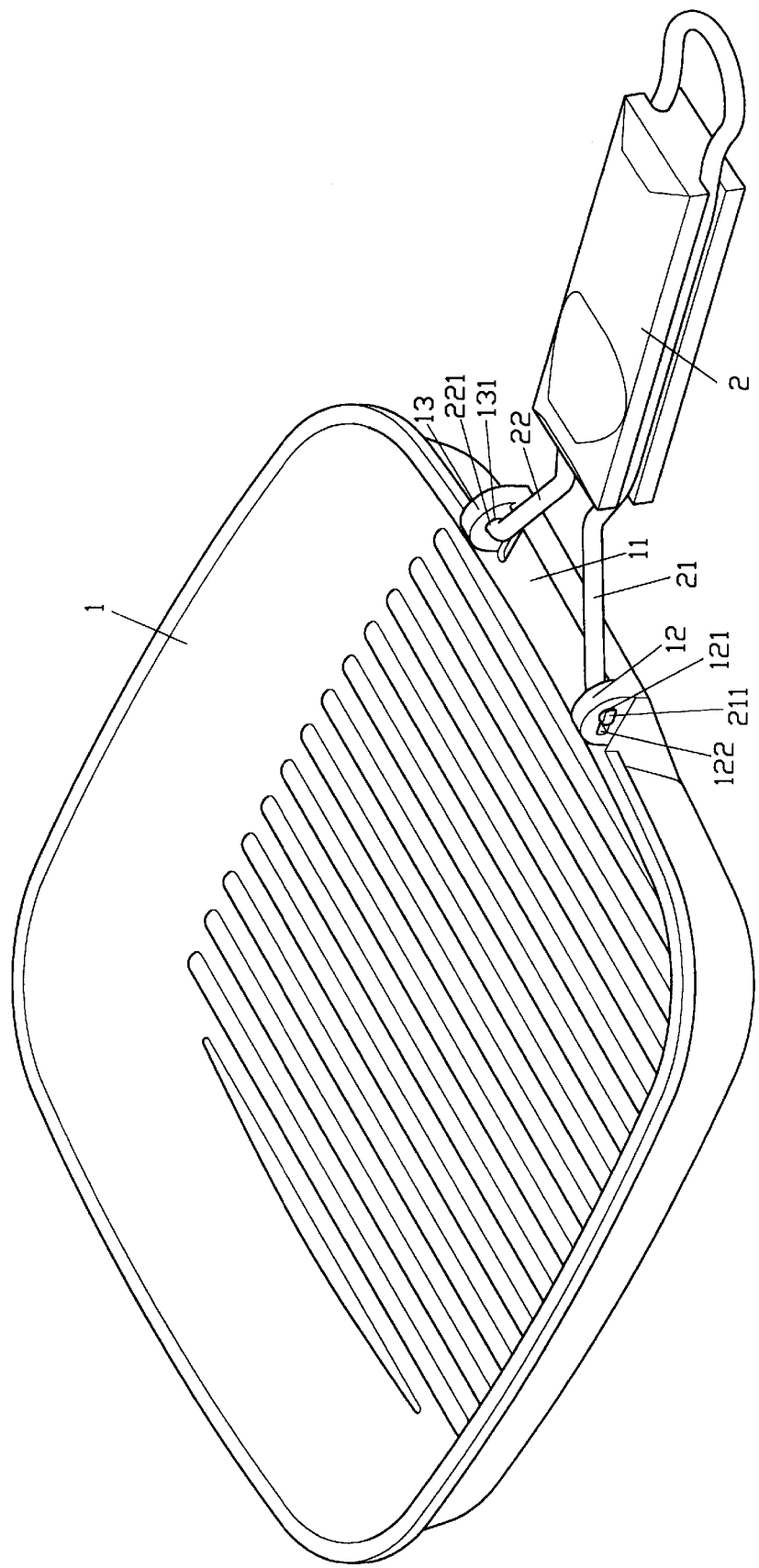
FIG. 2 is a perspective view of the invention.

Upon assembled, as shown in FIG. 2, the foldable handle 2 is connected to the pan 1 with the two elastic rods 21 and 22. The angled ends 211 and 221 are inserted in the holes 121 and 131 of the lugs 12 and 13, respectively.

Figure 3:
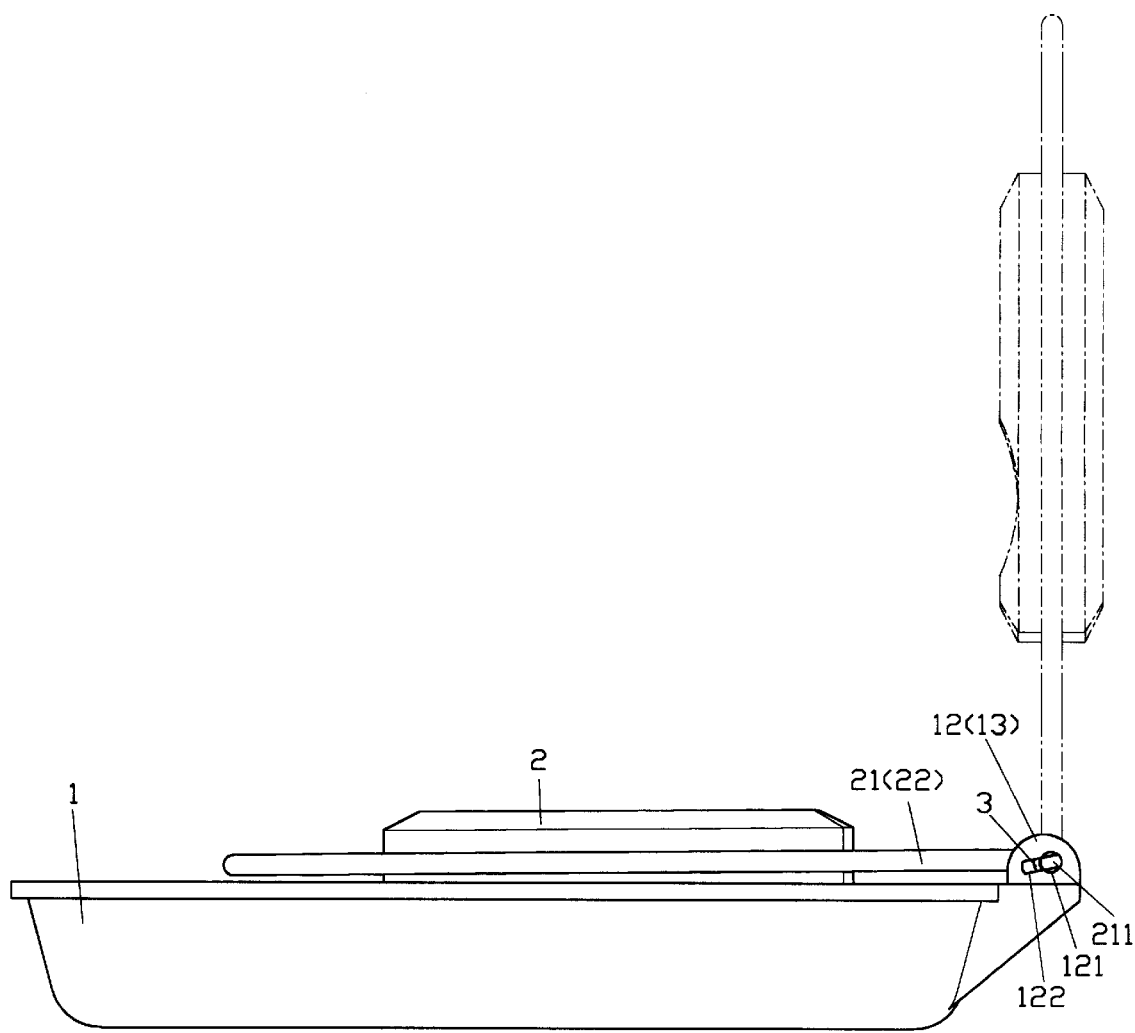
FIG. 3 is a side view depicting a folding status of the present invention.
Figure 4:
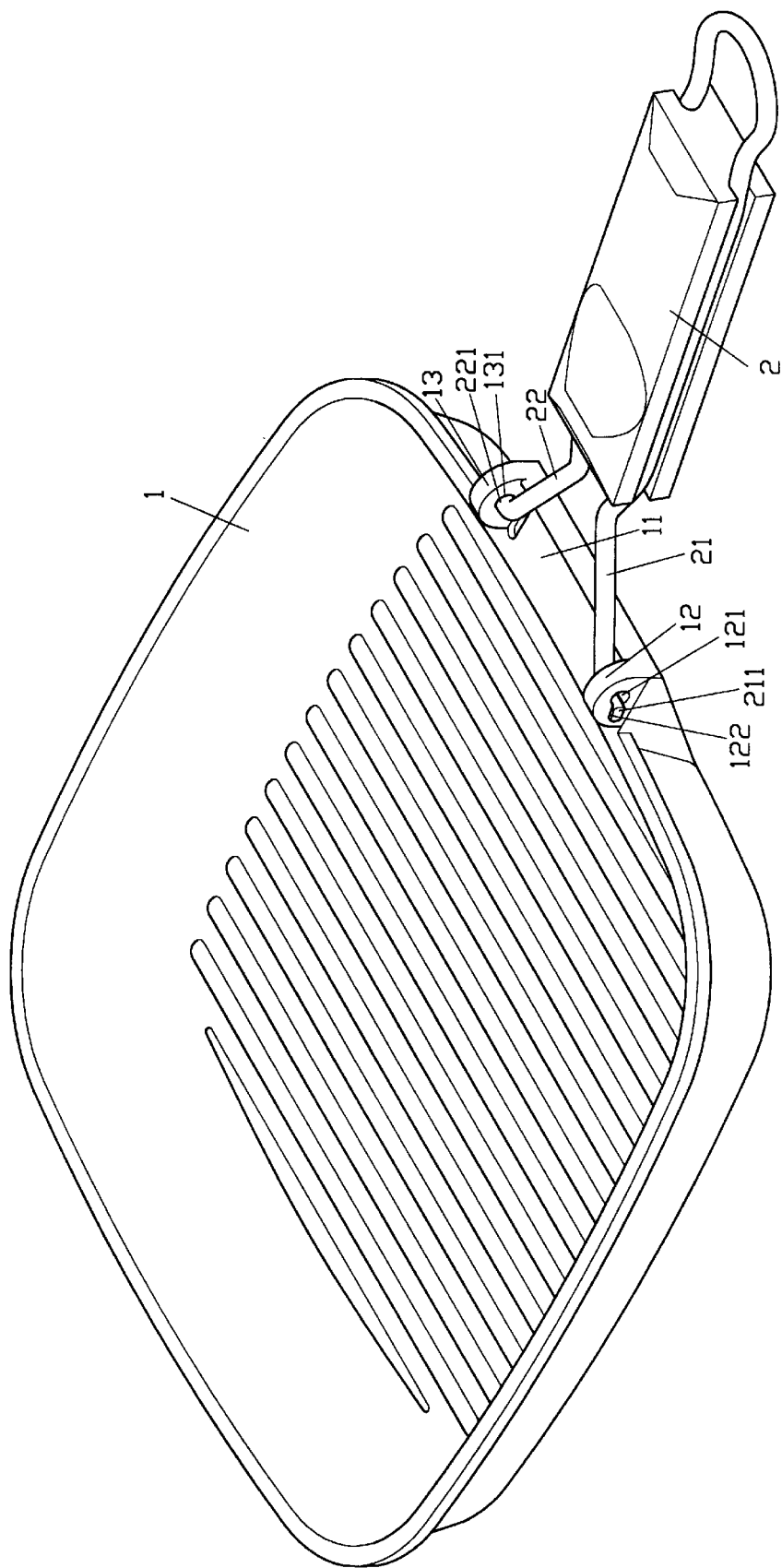
FIG. 4 is a perspective view showing the invention in an open status.

To fold the handle 2, as shown in FIG. 3, the angled end 211 of the rod 21 is pulled away from the slot 122, then the handle 2 is lifted up and pushed towards the pan 1, thus, the handle 2 may be folded with the pan 1.

To extend the handle 2, the angled end 211 of the rod 21 is pushed towards the slot 122 of the hole 121, thus, the slot 122 shall prevents the angled end 211 from rotating, and the handle 2 is in a secured position.

I claim:

1. A pan with a foldable handle comprising a holder at one side of said pan, said holder comprising a pair of lugs with a hole on each lug, said handle comprising a pair of elastic rods with an angled end on each elastic rod to be inserted through a corresponding hole of said lug, respectively, and the improvements comprising:

one of said lugs being connected to a slot, said slot having a width smaller than the inner diameter of said hole of said lug, one of said angled end of said elastic rod of said handle being formed with a flat shape having a thickness slightly smaller than the width of said slot and a width slightly smaller than the inner diameter of said hole, thus, when said angled end staying in said slot of said hole of said lug, said handle is secured, and when said angled end being pulled away from said slot and staying in said hole of said lug, said handle being free to rotate.

2. The pan with a foldable handle as recited in claim 1, wherein said angled end of said elastic rod of said handle is secured with a washer to engage at an inner side of said hole and said slot.

* * * * *